United States Patent [19]

Perez

[11] 4,213,450

[45] Jul. 22, 1980

[54] MODULAR SOLAR COLLECTOR PANEL AND MANIFOLD THEREFOR

[76] Inventor: Gilbert H. Perez, 3517 Chablis Cir., San Jose, Calif. 95132

[21] Appl. No.: 878,821

[22] Filed: Feb. 17, 1978

[51] Int. Cl.² ............................................. F24J 3/02
[52] U.S. Cl. ................................... 126/448; 126/450
[58] Field of Search ............... 126/271, 270, 448, 447, 126/442, 443; 137/884; 237/1 A; 165/173, 143; 138/116, 115

[56] References Cited

U.S. PATENT DOCUMENTS

| | | | |
|---|---|---|---|
| 3,859,980 | 1/1975 | Crawford | 126/271 |
| 3,948,247 | 4/1976 | Heilemann | 126/271 |
| 4,023,557 | 5/1977 | Thorne et al. | 126/271 |
| 4,024,853 | 5/1977 | Gordon | 126/271 |
| 4,040,566 | 8/1977 | Chiarelli | 237/1 A |
| 4,048,981 | 9/1977 | Hobbs | 237/1 A X |
| 4,063,544 | 12/1977 | Bowen | 126/270 |
| 4,120,283 | 10/1978 | Eder | 126/270 |
| 4,120,286 | 10/1978 | Farber | 126/271 |
| 4,120,289 | 10/1978 | Bottum | 126/271 |

*Primary Examiner*—Carroll B. Dority, Jr.
*Assistant Examiner*—Randall L. Green

[57] ABSTRACT

Presented is a modular solar panel designed to minimize manufacturing costs and to simplify assembly and installation procedures and including a plurality of elongated water tight tubular members joined by a manifold at each end and having provision for enclosing the panel thus formed by a solar energy transparent membrane.

4 Claims, 8 Drawing Figures

MODULAR SOLAR COLLECTOR PANEL AND MANIFOLD THEREFOR

BACKGROUND OF THE INVENTION

1. Field of the Invention

This invention relates to solar collectors, and particularly to a modular solar panel constituting a solar heat collector and to manifold means for joining a plurality of elongated water carrying heat absorbing tubular members.

2. Description of the Prior Art

The prior art related to this invention is believed found in Class 126, sub-class 271. A search through this field of search has revealed the existence of U.S. Pat. Nos. 3,859,980, 3,916,871, 3,934,323, 2,388,910, 3,125,091, 4,011,856. Of all of the patents listed it is believed that U.S. Pat. No. 3,859,980 is perhaps the most pertinent.

Literally thousands of people are exercising their creative abilities to invent and reduce to practice various types of solar energy utilization devices. One of the most expeditious means of harnessing solar energy for use substantially non-technical applications such as domestic water heaters and swimming pools is a solar panel adapted to be mounted on a roof or on a separate support structure or along a fence where it receives maximum radiation from the sun. Such conventional solar panels are frequently fabricated from materials such as aluminum or copper and are frequently painted or otherwise treated to expose a dark or black surface to convert such panels into a heat absorbing black body or heat reservoir.

Such technical considerations, while important from a technical point of view, increase the cost of solar panels to the point of prohibiting their use by a major portion of the population. Accordingly, one of the objects of the present invention is to provide a solar energy collecting device or panel that is modular in its construction and which adequately serves the need for most solar heat collector installations in terms of its capacity to heat water.

Most solar energy collecting devices must be factory fabricated and must be installed by skilled contractors who work at premium prices largely because the installation of solar heating apparatus is still innovative and little information is available regarding proper installation. Accordingly, another object of the invention is the provision of a modular solar energy collecting panel that is so simple in its components that such components may be purchased in kit form by the ultimate user through mail order or other outlets and easily assembled into solar collecting panels and installed on whatever support is appropriate, be it a roof, a separate support structure, or an available fence.

Many commercially available solar energy collector panels constitute an enclosed and sealed envelope to eliminate the possibility of loss of collected heat through the process of convection. Such structures require expensive construction techniques, sometimes including evacuation of the envelope so as to surround the heat absorbing elements with an evacuated space which functions as insulation to prevent the loss of heat. It has been found that for most domestic purposes it is not necessary that the heat collector panel be fully enclosed or that it be evacuated to be effective within the limits prescribed by domestic use. Accordingly, a still further object of the invention is the provision of a solar heat collecting panel that incorporates means for enveloping at least one side of the heat collecting panel, preferably the side thereof exposed to the sun, with an easily applicable or replaceable transparent membrane.

Many conventional solar heat collecting panels for domestic use are unwieldy in that they are relatively long, frequently as long as 8 or 9 feet, and in some instances are as wide as 4 feet. Such a structure is unwieldy not only because of its size, but is difficult to handle because of the risk of damage to the panel if unexpected stresses are imposed. Accordingly, a still further object is the provision of a solar energy collecting panel that is relatively narrow in its final modular form and which can be constructed of any length and which may be easily and effectively joined to adjacent modular panels without the use of special tools.

The invention possesses other objects and features of advantage, some of which, with the foregoing, will be apparent from the following description and the drawings. It is to be understood however that the invention is not limited to the embodiment illustrated and described since it may be embodied in other forms within the scope of the appended claims.

SUMMARY OF THE INVENTION

In terms of broad inclusion, the invention comprises a modular solar energy collecting panel fabricated from a multiplicity of elongated water-tight tubes associated with a pair of opposed manifolds adapted to receive the elongated tubes, both the tubes and the manifolds being constructed as modular units to permit assembly at the site of installation and to permit the cooperative association of two or more panels in any given installation. Means are also provided for enclosing the upper surface of the heat collector panel after assembly so as to minimize the loss of heat from the heat collector tubes through convection.

DESCRIPTION OF THE PREFERRED EMBODIMENT

In terms of greater detail, the solar energy collecting panel and manifold of the invention constitutes a structure that is particularly advantageous from at least three different aspects, namely, economy of manufacture, simplicity in assembly and ease of installation. Only a limited number of components are required for the assembly, one of the primary components constituting a manifold designated generally by the numeral 2, and comprising an elongated tube 3, preferably fabricated from an appropriate synthetic resinous material such as polyvinyl chloride (PVC), and preferably formed in one of the darker colors such as black or green. The manifold is preferably injection molded to have a length of approximately 12" to 14" and a diameter of approximately 2½" and formed at one end with a cylindrical bell housing 4 of sufficient diameter to accomodate the opposite open end of an associated manifold in a manner which is well known in the plumbing industry.

Figure 1:
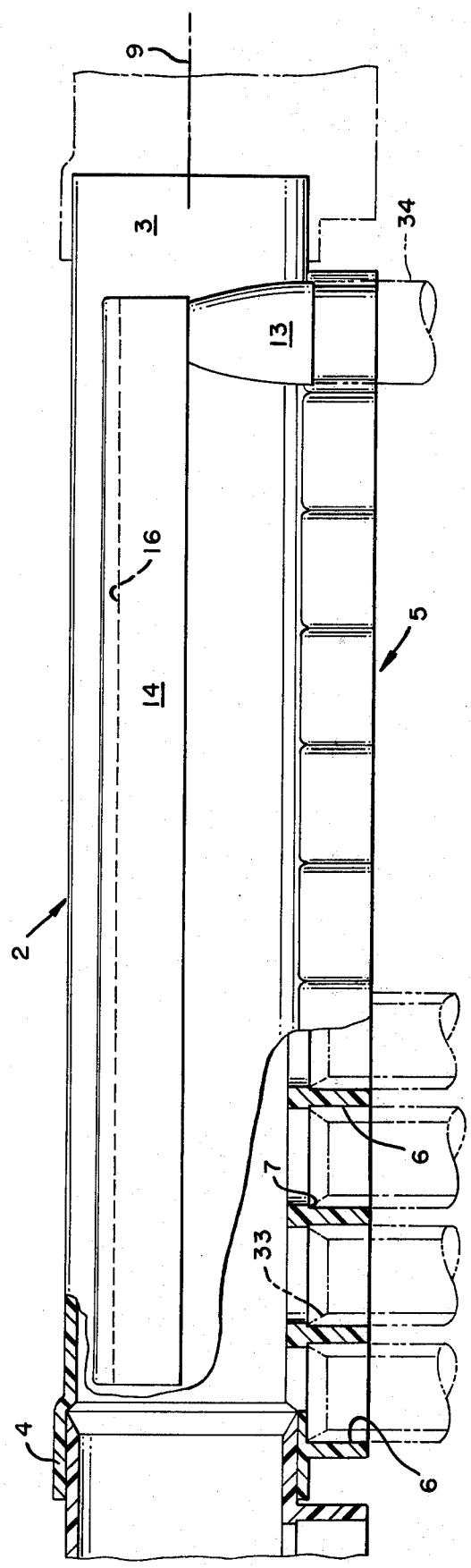
FIG. 1 is a plan view of one of the manifolds, a portion of the structure being broken away to reveal the interrelationship of the manifold with an associated axially arranged manifold.
Figure 2:
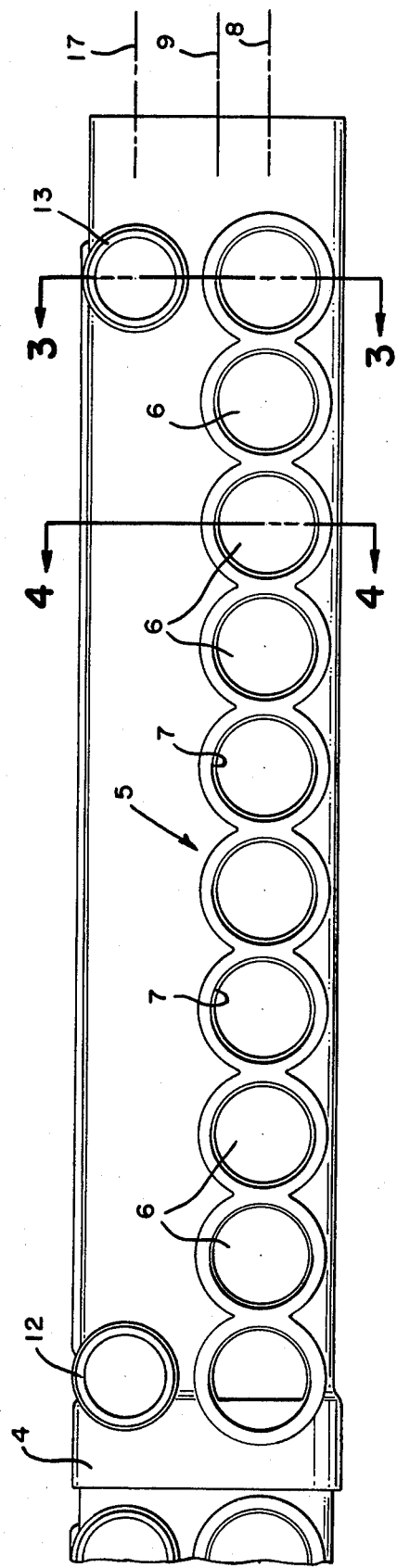
FIG. 2 is a side elevational view of one of the manifolds showing the distribution of solar energy collector tube sockets extending therealong in a series.
Figure 3:
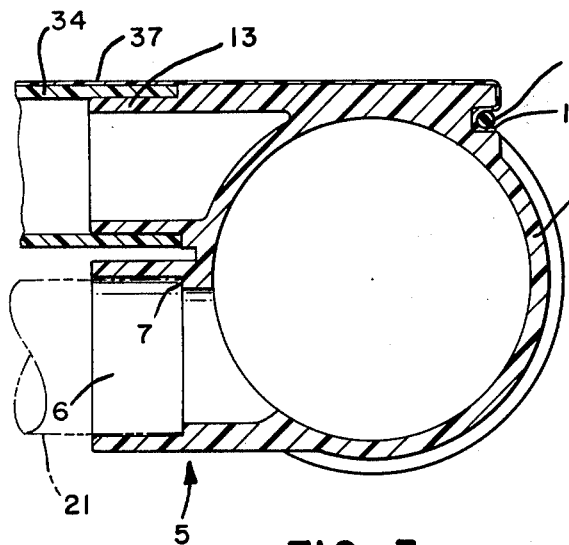
FIG. 3 is a vertical cross-sectional view taken in the plane indicated by the line 3—3 in FIG. 2.
Figure 4:
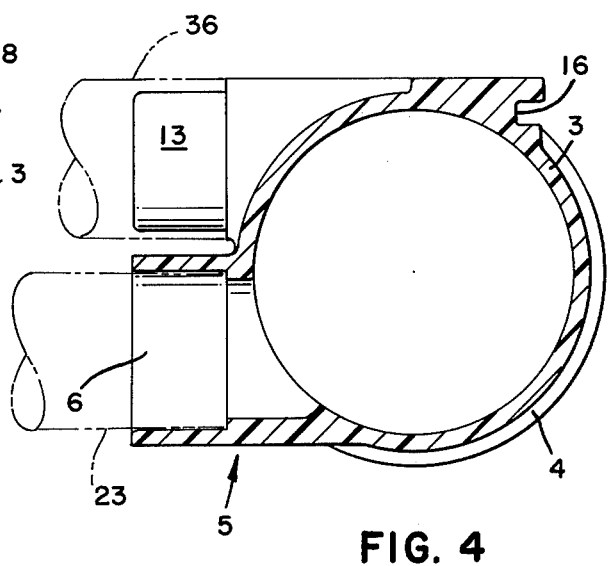
FIG. 4 is a vertical cross-sectional view taken in the plane indicated by the line 4—4 in FIG. 2.

Referring to FIGS. 1 and 2, it will be seen that the manifold is provided with an elongated generally quadrilateral projection designated generally by the numeral 5 and having a series of openings 6 formed therethrough to form socket openings communicating with the interior of the manifold. In the interest of brevity in this description, the same reference number is applied to all of the circular socket openings. It should be noted that the circular openings are provided interiorly with a shoulder 7 having a purpose which will hereinafter be explained. Additionally, it should be noted that all of the circular openings are formed around parallel axes that lie in a common plane designated by the numeral 8 and extending parallel with and spaced from the longitudinal axis 9 of the main body 3 of the manifold.

Also formed on the manifold and associated with opposite ends thereof, are a pair of socket members 12 and 13, each of which constitutes a support in a manner and for a purpose which will hereinafter be explained. Additionally, the manifold as an integral monolithic unit is also formed with an elongated rib 14 that lends rigidity to the wall of the manifold and which also provides a channel 16 extending over a major portion of the length of the manifold. It will be noted that the socket members 12 and 13 are symmetrical about axes that lie in a common plane represented by the line 17 in FIG. 2, the plane 17 being spaced on the opposite side of the central axis 9 of the manifold from the plane 8 in which lie the axes of openings 6. It should also be noted that socket members 12 and 13 lie spaced apart adjacent opposite ends of the manifold and closely adjacent the ends of the elongated rib 14.

Figure 5:
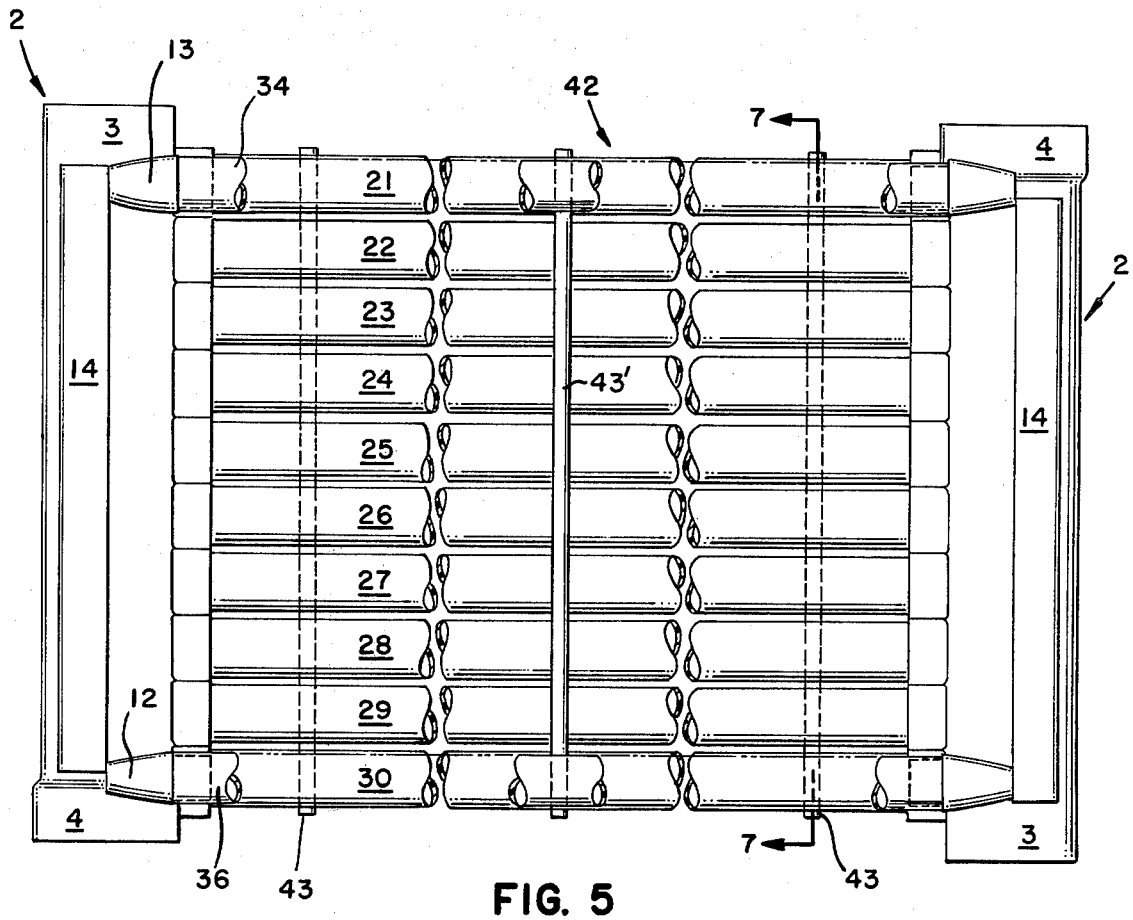
FIG. 5 is a plan view illustrating a pair of manifolds assembled with a plurality of closely juxtaposed solar energy collector tubes apart from any other structure.

The manifold thus formed is utilized in the manner indicated in FIGS. 3 and 5–7 to support a multiplicity of closely juxtaposed elongated synthetic resinous tubes 21, 22, 23, 24, 25, 26, 27, 28, 29 and 30, opposite ends of each of which are securely cemented in a water-tight manner into the openings 6 in oppositely arranged and mutually facing manifolds as shown best in FIG. 5. By virtue of the snug engagement of the ends of the tubes in the sockets formed by the openings 6, and particularly by virtue of the fact that the ends of each tube abut against the shoulders 7 within the socket openings, the widths of which may conveniently correspond to the wall thickness of the tubes so that the passage of water between the tubes and the manifolds follows a smooth path without impediment. Preferably, the shoulder is reduced in width and the ends of the tubes are chamferred as illustrated at 33 in FIG. 1.

With the structure thus formed, it will be apparent that water admitted to one manifold will course through all of the interconnecting tubes so as to expose such separate streams of water to the heating effect of solar radiation. To increase the effectiveness of such solar radiation, the socket members 12 and 13 are arranged to receive elongated tubular support members 34 and 36, opposite ends of which are suitably supported and cemented about the sockets which, as seen in FIGS. 2, 3, 4 and 6, lie spaced above the tube openings 6. To form an enclosure to reduce the transfer of heat by convection from the tubular heat collectors, a thin transparent membrane 37 is stretched between the tubular members 34 and 36 so that the longitudinal edge portions of the membrane lie draped over these members. The opposite ends of the membrane are tucked into the channels 16 of the manifolds and are caught and retained in each channel by a suitable resilient retainer 38. It will thus be seen that solar energy will be transmitted through the transparent membrane 37 to impinge on the closely underlying water-carrying heat collector tubes and the membrane will minimize the escape of heat from such collector tubes by minimizing or reducing circulation of air around the tubes.

Figure 8:
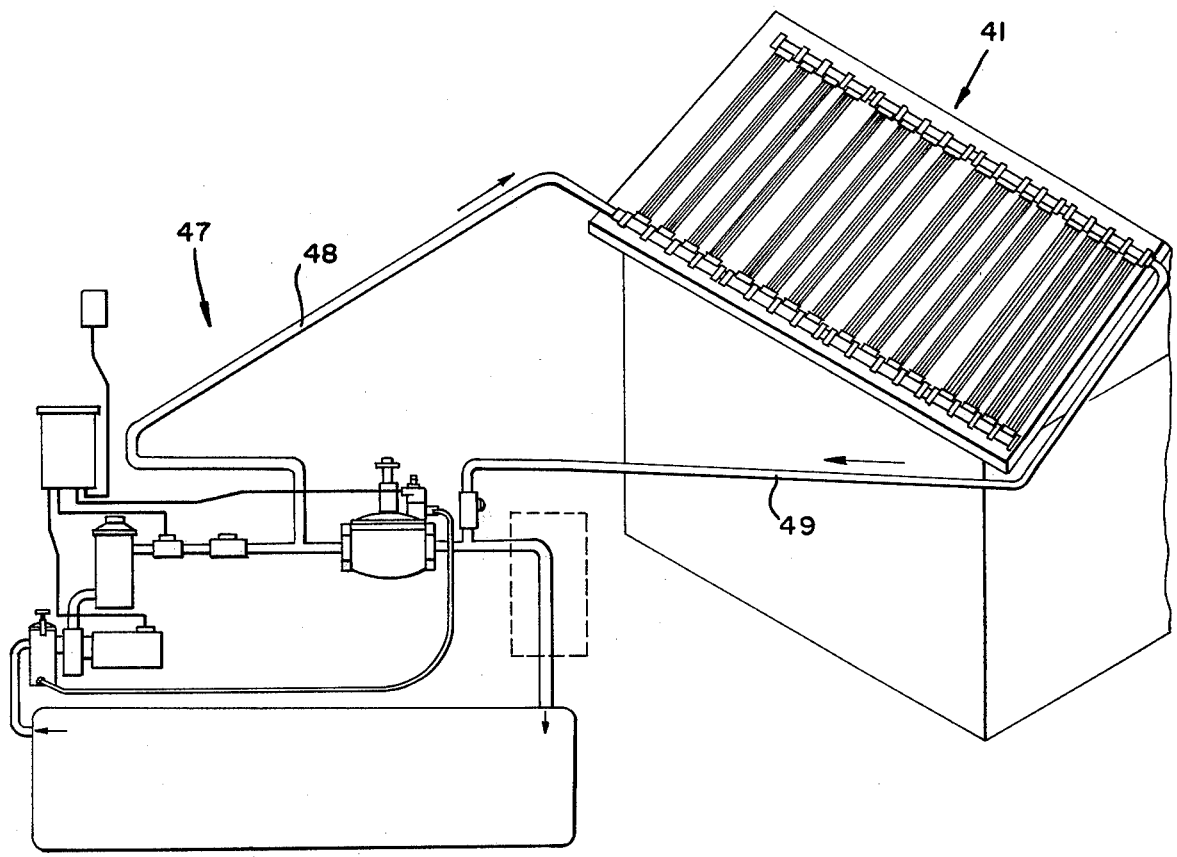
FIG. 8 is a perspective view illustrating an installation of a multiplicity of the panels shown in FIG. 5.

The panel thus formed, as illustrated in FIG. 5, is incorporated with other panels of like construction as illustrated generally at 41 in FIG. 8 where an array of such panels are illustrated interconnected and supported on one half of a gabled roof. As there illustrated, each modular unit, such as the unit shown in FIG. 5, is associated in groups of four, the manifolds 2 being connected end-to-end as illustrated with each group of four manifolds encompassing approximately forty elongated tubes. Each module of four interconnected panels is then further inter-connected with an adjacent module of four interconnected panels, and as many such modular groups may be interconnected as is required to provide the volume of water necessary for a given installation. It will of course be understood that while the association of four such panels as a module is illustrated in FIG. 8, a lesser number, or a greater number, could be utilized depending on the requirements of a given installation.

Figure 6:
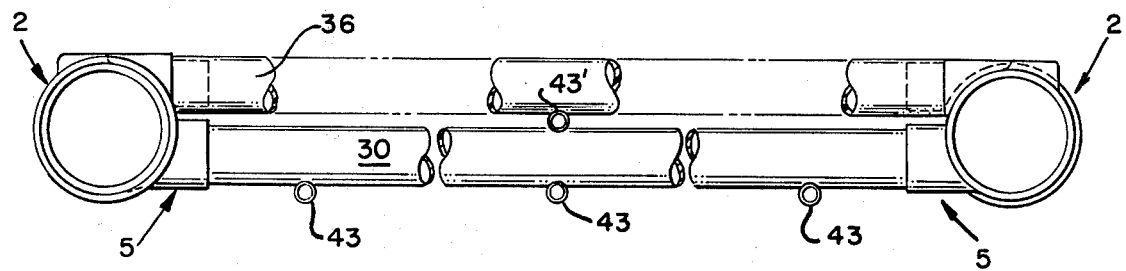
FIG. 6 is a side elevational view of the panel illustrated in FIG. 5.
Figure 7:
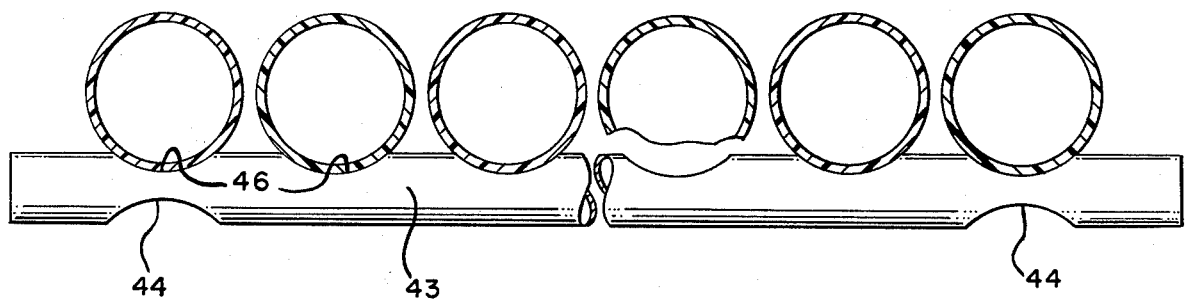
FIG. 7 is a fragmentary vertical cross-sectional view taken in the plane indicated by the line 7—7 in FIG. 5.

To assist in the support of the panels on a roof, it has been found useful to provide a plurality of stringers or spacers 43 under the tubes, each of the stringers 43 being itself an elongated tube or rod having on one side of a central axis a pair of spaced recesses 44 to permit the run-off of water therethrough when the rod or tube 43 is lying on a roof top, while on its side opposite the recesses 44 the tube 43 is provided with a series of recesses 46 having a configuration conforming to the outer periphery of the heat collector tubes and being spaced along the tube 43 in numbers corresponding to the number of heat collector tubes disposed thereabove. It will thus be seen that each of the stringer tubes 43 assists in preventing transverse displacement of the water-filled heat collector tubes and permits the run-off of rain water flowing over the roof such as during rainstorms. The recesses 44 thus prevent the tubes 43 from acting as baffles or dams for the runoff of rain water. Where desired one of the stringer tubes 43' may be inserted between the tubular support members 34 and 36 and the tubes 21–30, as illustrated in FIGS. 5 and 6.

Referring to FIG. 8, it will be seen that a plurality of such panels may be associated with a water pump system designated generally by the number 47 and including an inlet line 48 and outlet line 49, each connected to appropriate control mechanisms as shown that form no part of this invention and which will therefore not be described.

Having thus described the invention, what is believed to be novel and sought to be protected by letters patent of the United States is as follows:

I claim:

1. A monolithic manifold unit for use in the formation of a solar energy collector panel, comprising:
   (a) an elongated tubular body having a longitudinal axis and being substantially uniform in its transverse dimension over a major portion of its length, said tubular body having upper and lower portions and including an integral enlarged-diameter bell housing at one end thereof, the inner diameter of said bell housing being substantially equal to the outer diameter of the remainder of said tubular body;
   (b) a first elongated, transverse projection integrally formed on and extending in a first direction from the outer periphery of the lower portion of said tubular body and extending longitudinally therealong;
   (c) a plurality of closely-spaced apertures formed in said first projection and extending therethrough to communicate with the interior of said tubular body, said apertures being arranged in an aligned series and having their axes lying in a first plane which is parallel to, and spaced to one side of, said longitudinal axis of said tubular body, the axes of said apertures being parallel to each other and extending transverse to said longitudinal axis;
   (d) shoulder means formed on the interior surface of each of said apertures, each aperture forming a socket which is separate and spaced from adjacent apertures and adapted to receive one end of an elongated heat collector tube;
   (e) first and second support socket members adapted to receive support frame elements for the collector panel, said support socket members being integrally formed on the outer periphery of the upper portion of said tubular body adjacent opposite ends thereof, said socket members extending from the periphery of said tubular body in said first direction and being located directly above the endmost apertures in said first projection, the axes of said socket members being parallel to the axes of said apertures and lying in a second plane which is parallel to said first plane, said first and second planes being located on opposite sides of the longitudinal axis of said tubular body;
   (f) a second elongated transverse projection integrally formed on, and extending from, the periphery of the upper portion of said tubular body, and also extending most of the length of said manifold unit; and
   (g) an elongated channel formed in said second projection, said elongated channel being parallel to said longitudinal axis and facing in a second direction opposite said first direction and being adapted to receive and secure enclosure means for the collector panel.

2. A solar energy collector panel comprising:
   (a) first and second monolithic manifold units constructed in accordance with claim 1, said manifold units being spaced apart with their longitudinal axes substantially parallel to each other and with the axes of the socket apertures of the respective manifold units being aligned with each other;
   (b) a plurality of elongated solar energy collecting tubes each sealed in corresponding socket apertures and extending between said first and second manifold units to provide a communicating passageway between said manifolds, the communicating passageways formed by said plurality of tubes providing parallel flow paths between the manifolds;
   (c) first and second support frame elements sealed in and extending between corresponding support socket members of said first and second manifold units;
   (d) a transparent membrane extending across and supported above said plurality of collecting tubes by said first and second manifold units at its ends and by said support frame elements at its sides, to form an enclosure; and
   (e) means for detachably securing the opposite ends of said membrane in corresponding elongated channels formed on said first and second manifold units.

3. The combination according to claim 1, in which said manifold is injection molded from synthetic resinous material.

4. The combination according to claim 1, in which an elongated resilient retainer is associated with said manifold and resiliently engageable in said elongated channel formed in said second projection.

* * * * *